(12) United States Patent
Buermann et al.

(10) Patent No.: US 7,113,270 B2
(45) Date of Patent: Sep. 26, 2006

(54) DETERMINATION OF AN ORIENTATION PARAMETER OF AN ELONGATE OBJECT WITH A SCAN BEAM APPARATUS

(75) Inventors: Dale H. Buermann, Los Altos, CA (US); Michael J. Mandella, San Jose, CA (US)

(73) Assignee: Electronics Scripting Products, Inc., Palo Alto, CA (US)

( * ) Notice: Subject to any disclaimer, the term of this patent is extended or adjusted under 35 U.S.C. 154(b) by 316 days.

(21) Appl. No.: 10/871,496

(22) Filed: Jun. 18, 2004

(65) Prior Publication Data

US 2005/0280804 A1    Dec. 22, 2005

(51) Int. Cl.
G01B 11/26    (2006.01)
G06F 3/042    (2006.01)

(52) U.S. Cl. .............................. 356/139.03; 356/139.1; 178/18.09

(58) Field of Classification Search ................ 356/138, 356/139.1, 139.03, 153, 623; 250/559.29, 250/559.31; 178/18.09–19
See application file for complete search history.

(56) References Cited

U.S. PATENT DOCUMENTS

| | | | |
|---|---|---|---|
| 4,326,799 A | 4/1982 | Keene et al. | |
| 5,166,668 A | 11/1992 | Aoyagi | |
| 5,434,371 A | 7/1995 | Brooks | |
| 5,592,211 A | 1/1997 | Porter et al. | |
| 5,638,164 A | 6/1997 | Landau | |
| 5,699,149 A | 12/1997 | Kuroda et al. | |
| 5,786,804 A | 7/1998 | Gordon | |
| 5,884,239 A * | 3/1999 | Romanik, Jr. | ............... 702/150 |
| 5,889,582 A | 3/1999 | Wong et al. | |
| 5,892,575 A | 4/1999 | Marino | |
| 5,902,968 A | 5/1999 | Sato et al. | |
| 5,977,958 A | 11/1999 | Baron et al. | |
| 5,981,884 A | 11/1999 | Sato et al. | |
| 6,023,291 A | 2/2000 | Kamel et al. | |
| 6,583,869 B1 * | 6/2003 | Sheridan | ..................... 356/153 |
| 2002/0141616 A1 | 10/2002 | Cox et al. | |
| 2002/0148655 A1 | 10/2002 | Cho et al. | |
| 2002/0180714 A1 | 12/2002 | Duret | |
| 2003/0025951 A1 | 2/2003 | Pollard et al. | |

FOREIGN PATENT DOCUMENTS

JP    6-67799    3/1994

OTHER PUBLICATIONS

Goldstein et al., Classical Mechanics, 3rd Edition, Addison Wesley, 2002.

* cited by examiner

*Primary Examiner*—Thomas H. Tarcza
*Assistant Examiner*—Isam Alsomiri
(74) *Attorney, Agent, or Firm*—Lumen Intellectual Property Services, Inc.

(57) ABSTRACT

An elongate object optically determines at least one of its orientation parameters relative to a plane surface. A probe radiation beam is directed from the object at various angles $\sigma$ to various locations on the plane, where the angle $\sigma$ is a periodic function of time. Two angularly-selective radiation detectors oriented at fixed angles $\tau_1$ and $\tau_2$ sense scattered portions of the beam from two locations at two corresponding times. The orientation parameter is computed from a time difference $\Delta t = t_2 - t_1$ between the two times.

17 Claims, 4 Drawing Sheets

DETERMINATION OF AN ORIENTATION PARAMETER OF AN ELONGATE OBJECT WITH A SCAN BEAM APPARATUS

FIELD OF THE INVENTION

The present invention relates generally to methods and devices for determining one or more orientation parameters of an elongate object whose tip is contacting a surface.

BACKGROUND OF THE INVENTION

When an object moves with respect to a reference frame, knowledge of the object's orientation with respect to the reference frame can be useful for deriving a variety of its parameters of motion. In fact, the orientation of an object with respect to a reference is usually required for navigating the object or obtaining information about its trajectory. Over time, many useful coordinate systems and methods have been developed to parameterize the equations of motion of such objects. For a theoretical background the reader is referred to textbooks on classical mechanics such as Goldstein et al., *Classical Mechanics*, $3^{rd}$ Edition (Addison Wesley, 2002). For general examples of object tracking and orientation measurements a few examples can be found in U.S. Pat. No. 5,786,804 to Gordon and U.S. Pat. No. 6,023,291 to Kamel et al. as well as the references cited therein.

In one specific field of navigation it is important to know the inclination angle of an elongate object while it is in contact with a plane surface. Usually, inclination is defined as the angle between a line normal to the plane surface and an axis of the object that passes through its point of contact with the plane surface. In some cases, this axis is also the centerline of the elongate object. Various types of elongate objects can benefit from knowledge of their inclination while in contact with a plane surface. These objects include walking canes when in contact with the ground, pointers when in contact with a display or projection surface, writing devices when in contact with a writing surface, and styluses when in contact with an input screen.

In the field of input devices such as pens and styluses, inclination information is useful in order to analyze the information written or traced by the user. In principle, many methods can be adapted to measure pen inclination. Such methods can employ ranging devices using ultrasound, electromagnetic radiation including visible light and other apparatus. For example, U.S. Pat. No. 5,166,668 teaches a 3-axis detection method, U.S. Pat. No. 5,977,958 teaches a method using a difference in the time-of-flight of an electromagnetic wave, and still other references teach to apply the time-of-flight method to microwaves. Still other approaches use calibration marks, e.g., as described in U.S. Pat. Appl. 2003/0025951 or entire auxiliary calibration systems as described in U.S. Pat. Appl. 2002/0141616. Still another method for measuring the inclination of a pen employs sensors mounted in the pen for measuring magnetic fields created by magnetic dipoles oriented perpendicular to a writing board as described in U.S. Pat. Appl. 2002/0180714. Unfortunately, all of these methods are cumbersome and limiting to the user because the signals sent from the pen have to be received by external devices. In other words, the pen cannot independently determine its inclination with on-board equipment.

In principle, a pen equipped with inertial sensors such as gyroscopes and accelerometers can derive its inclination without dependence upon external devices. Japan patent application 6-67,799 proposes a method for determining the inclination angle by integrating the angular velocity of the pen obtained from a two-axis acceleration sensor. Also of interest are U.S. Pat. Nos. 5,902,968 and 5,981,884 using a three-axis acceleration sensor and a three-axis gyroscope. U.S. Pat. No. 5,434,371 teaches a structure in which an acceleration sensor is attached to the tip of a pen such to thus compensate the error due to pen inclination and a signal processing portion is located at the upper portion of the pen.

Unfortunately, inertial sensors suffer from drift errors and accumulation errors that typically increase quadratically with time for accelerometers and linearly with time for gyroscopes. To overcome these limitations of inertial sensors U.S. Pat. Appl. No. 2002/0148655 to Cho et al. teaches the use of an optical three-dimensional detecting device for detecting orientation angles of a centerline of an electronic pen relative to a ground and a height of the pen over a writing surface. Meanwhile, a three-axis accelerometer is used for detecting movement of the pen. The optical device has a portion such as a light source for radiating a beam to the writing surface to form beam spots and a detecting portion such as a camera and corresponding optics for detecting the beam spots from the light reflected off the writing surface.

Although Cho's teaching goes far to solve the problems, it still lacks the versatility, efficiency and accuracy to be employed in determining orientation parameters of writing devices and elongate objects in general.

SUMMARY OF THE INVENTION

In view of the shortcomings of the prior art, the present invention provides methods and devices for determining one or more orientation parameters of an elongate object using on-board equipment. The invention may be realized as an apparatus that is small and compatible with a self-contained jotting implement, such as a pen, pencil or stylus.

In one aspect of the invention, a method is provided for determining at least one orientation parameter of an elongate object having a tip contacting a plane surface. According to the method, the plane surface is illuminated with a probe radiation beam emitted from the elongate object at an angle σ relative to an axis of the elongate object. The angle σ is varied in accordance with a predetermined pattern so that the probe radiation beam illuminates various locations on the plane surface at various corresponding times. The elongate object detects at a first time $t_1$ a first scattered portion of the probe radiation beam returning from a first illuminated location along a path having a first predetermined angle $\tau_1$ relative to the axis. Similarly, the elongate object detects at a second time $t_2$ a second scattered portion of the probe radiation beam returning from a second illuminated location along a path having a second predetermined angle $\tau_1$ relative to the axis. The orientation parameter may then be derived from a time difference $\Delta t = t_2 - t_1$ between detecting the first scattered portion and the second scattered portion.

According to one particular embodiment, the predetermined pattern is a continuous scan pattern that may, for example, be a uniaxial or biaxial scan pattern. The uniaxial scan pattern preferably varies sinusoidally with respect to time such that the first and second illuminated locations are illuminated during a substantially linear region of variation.

Preferably, the orientation parameter comprises an inclination angle, e.g., the second Euler angle θ. In addition, the method may also determine a roll angle, e.g., the third Euler angle ψ. The plane surface may be a jotting surface such as a screen, a display, a pad, or a paper surface. The elongate object may be any one of various types of jotting implements such as pens, pencils, or styluses. The elongate object may also be one of various types of pointers, robotic arms, or canes.

According to another aspect of the invention, an apparatus is provided for determining at least one orientation parameter of an elongate object having a tip contacting a plane surface. The apparatus includes a beam source for emitting a probe radiation beam from the elongate object to illuminate the plane surface. The apparatus also includes a beam direction controller that directs the probe radiation beam from the elongate object at various angles σ relative to an axis of the elongate object to various locations on the plane. The various angles σ are controlled so that the beam follows a predetermined pattern. The apparatus also includes two angularly-selective radiation detectors. A first angularly-selective radiation detector senses at a first time $t_1$ a first scattered portion of the probe radiation beam returning from a first location on the plane surface to the elongate object along a first path having a first angle $\tau_1$ relative to the axis. Similarly, a second angularly-selective radiation detector for sensing at a second time $t_2$ a second scattered portion of the probe radiation beam returning from a second location on the plane surface to the elongate object along a second path having a second angle $\tau_2$ relative to the axis. The angles $\tau_1$ and $\tau_2$ are distinct. A computing unit in the apparatus then derives the orientation parameter from a time difference $\Delta t = t_2 - t_1$ between sensing the first scattered portion and sensing the second scattered portion.

According to one specific embodiment, the beam source includes a laser diode or vertical cavity surface emitting laser (VCSEL). The beam direction controller includes a uniaxial or biaxial beam scanner. In a uniaxial scanner, the beam angle σ may be varied by introducing a time-varying x-deflection angle $\gamma_x$ of a beam deflection element, such as a microelectromechanical systems (MEMS) micromirror. The beam direction controller may comprise a timing unit to generate a sinusoidal variation in the x-deflection angle at an angular frequency $\omega(t)=A \sin(\alpha t)$, where A is a maximum deflection angle and α is significantly larger than a desired sampling frequency of the pen orientation parameter. Alternatively, a biaxial scanner may vary beam angle σ by changing both an x-deflection angle $\gamma_x$ and a y-deflection angle $\gamma_y$ of a beam deflection element. When using a biaxial scanner, the scan pattern can be a raster scan pattern, line scan pattern or a Lissajous figure.

Each angularly-selective detector is preferably an angular gating optic composed of suitable optical elements such as apertures, holographic elements, diffractive elements, refractive elements and reflective elements. The angularly-selective detector may also include a cylindrical lens, a collimating lens, a thick aperture, a system of apertures or a slit. The detector preferably also includes a photoelectric element such as a photodiode or photodetector array for converting received optical energy to an electronic signal. Each angularly-sensitive detectors is designed to be sensitive to radiation incident at a fixed characteristic angle τ. In one embodiment, difference $\tau_1 - \tau_2$ is preferably selected together with the maximum mirror deflection amplitude A so that detection of the first and second scattered portions of the probe radiation beam at angles $\tau_1$ and $\tau_2$ correspond to mirror deflections of no more than 88% of A during normal operation of the device.

The computing unit may include a timing circuit that determines the time difference and a look-up table that stores a precomputed table of time difference values and corresponding orientation parameter values. Alternatively, the computing unit may include a timing circuit and computational circuitry for calculating in real time the orientation parameter from the time difference.

DETAILED DESCRIPTION

Figure 1A:
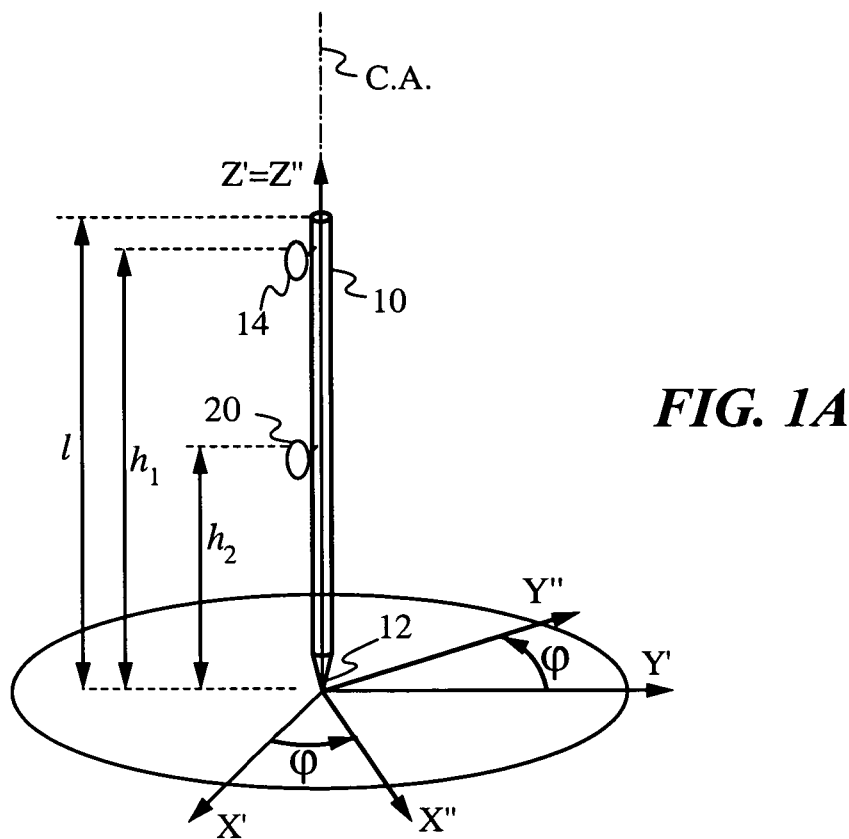
FIGS. 1A–C illustrate first, second, and third Euler rotations, respectively, of an elongate object in accordance with the teachings of the present invention.

The present invention will be best understood by initially reviewing Euler rotations as used herein to describe the pose of an elongate object 10. The term pose is defined most generally as including both position and spatial orientation of elongate object 10. FIG. 1A illustrates object 10 of length l with a tip 12 at the origin of non-rotated object coordinates (X',Y',Z'). An axis of object 10, which in the present embodiment is a central axis denoted by C.A., is collinear with the Z' axis. Axis C.A. passes through tip 12 and the origin of non-rotated object coordinates (X',Y',Z'). A beam direction controller 14 is mounted on object 10 at a height $h_1$ and a detector 20 is mounted on object 10 at a height $h_2$. Controller 14 and detector 20 are initially aligned with the X' axis.

FIG. 1A illustrates a first counterclockwise rotation about the Z' axis by first Euler angle Φ of object coordinates (X',Y',Z') to yield once-rotated coordinates (X",Y",Z"). Because this rotation of the object coordinates does not change the Z' axis, the Z" axis is collinear with non-rotated Z' axis (i.e., Z"=Z'). On the other hand, axes X' and Y' are rotated by first Euler angle Φ to yield once-rotated axes X" and Y".

Figure 1B:
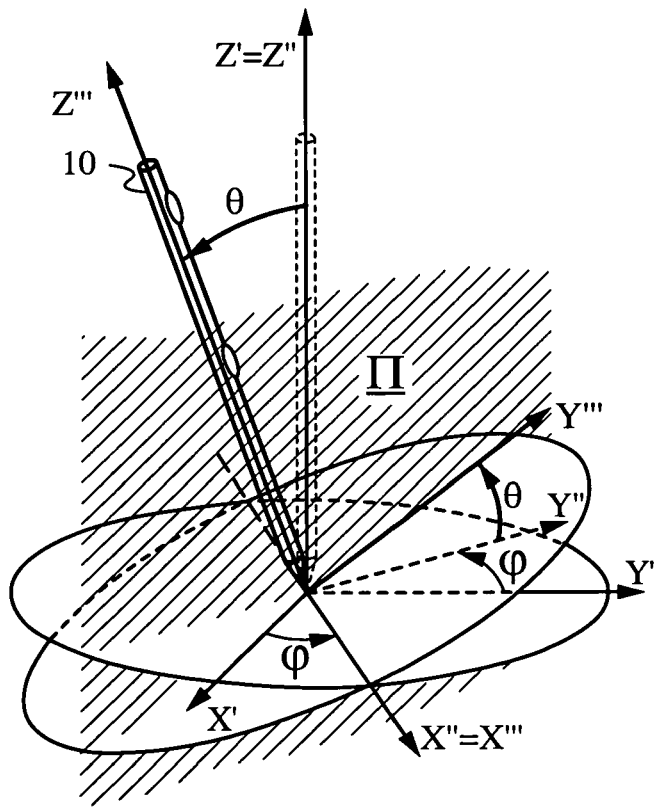

FIG. 1B illustrates a second counterclockwise rotation by second Euler angle θ applied to once-rotated object coordinates (X",Y",Z") to yield twice-rotated object coordinates (X''',Y''',Z'''). This second rotation is performed about the X" axis and therefore it does not change the X" axis (i.e., X'''=X"). On the other hand, axes Y" and Z" are rotated by second Euler angle θ within a plane $\overset{3}{\mathcal{V}}$ to yield twice-rotated axes Y''' and Z'''.

Figure 1C:
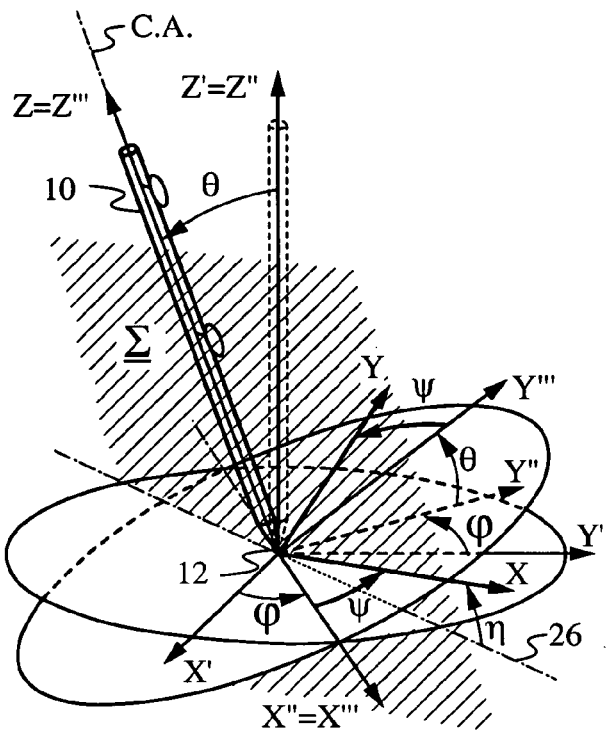

As shown in FIG. 1C, a third counterclockwise rotation by third Euler angle ψ is applied to twice-rotated object coordinates (X''',Y''',Z''') to yield Euler rotated object coordinates (X,Y,Z). Rotation by ψ is performed about axis Z''', rotating axes X''' and Y''' by and angle ψ to yield rotated object axes X,Y. Object axis Z coincides with rotation axis Z'''. Object axes X,Y,Z rotated by all three Euler angles φ, θ and ψ define Euler rotated object coordinates (X,Y,Z). Note that tip 12 of object 10 remains at the origin of all coordinates during the Euler rotations. Observe that the X-Z plane Σ intersects the X'-Y' plane along line 26. The angle in plane Σ between line 26 and the X-axis is denoted η. It is evident that the angle η is another example of an orientation parameter of the elongate object 10. Moreover, orientation parameters θ and ψ are related to η by the equation sin η=sin θcos ψ. Also note that beam direction controller 14 is aligned with the X-axis and thus contained in plane Σ.

Figure 2:
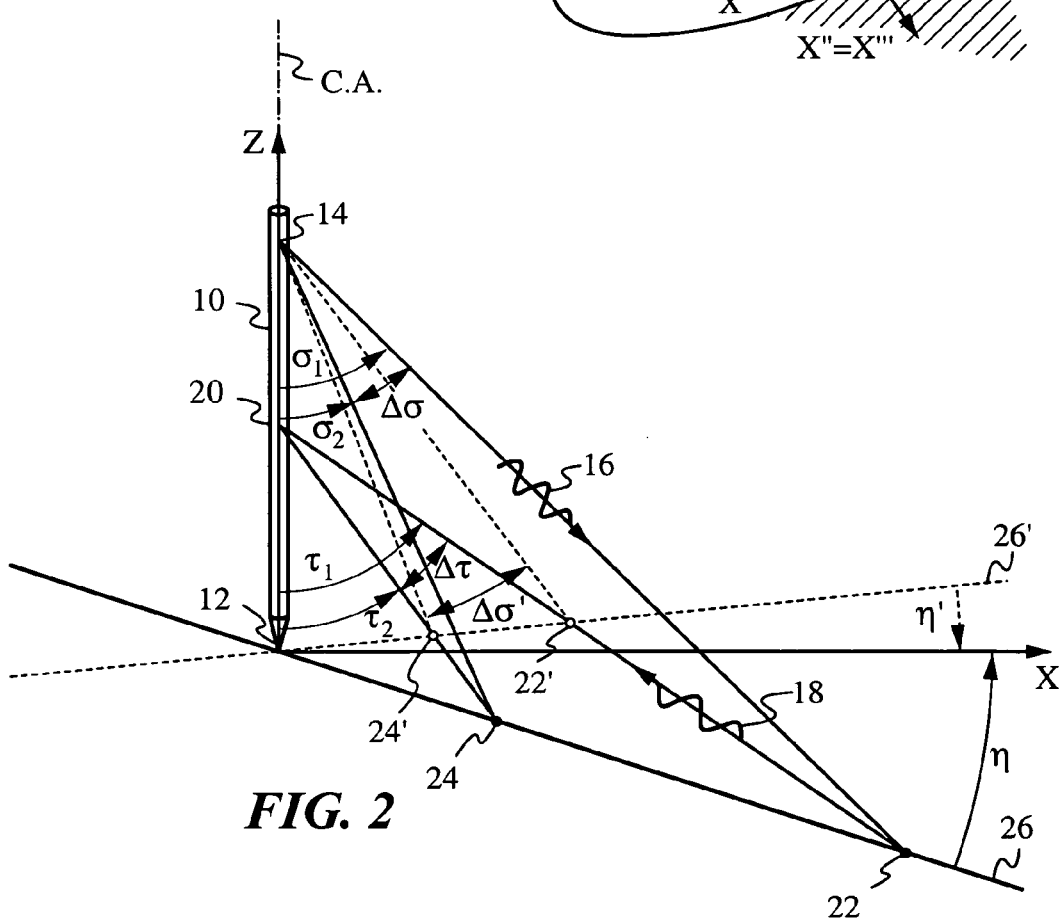
FIG. 2 is a cross-sectional view in plane Σ of the elongate object shown in FIG. 1C.

FIG. 2 is a cross-sectional view in plane Σ of FIG. 1C. Since plane Σ intersects the X'-Y' plane surface along line 26, the X'-Y' plane surface is represented in FIG. 2 as line 26. Elongate object 10 contacts plane surface 26 at its tip 12. Surface 26 is oriented at angle η relative to the X-axis.

Elongate object 10 includes a beam source (not shown) for generating a probe radiation beam and a beam direction controller 14 that directs the probe radiation beam from the elongate object 10 at various angles σ relative to the Z-axis to various locations on the plane 26. For example, at a first time $t_1$ when the beam is directed at angle $\sigma_1$, probe radiation 16 travels from beam direction controller 14 to a first location 22 on plane 26. At a second time $t_2$ when the beam is directed at angle $\sigma_2$, it travels from beam direction controller 14 to a second location 24.

The probe radiation incident on the surface 26 scatters in various directions in accordance with the properties of the surface. Typically, surface 26 will be Lambertian. In particular, a scattered portion of the probe radiation beam will return toward the detector 20 of object 10. For example, probe radiation 16 incident at first location 22 at time $t_1$ produces a scattered portion 18 which propagates toward detector 20. Similarly, probe radiation incident at second location 24 at time $t_2$ produces a scattered portion which also propagates toward detector 20. These scattered portions follow distinct paths from the distinct locations 22 and 24 to detector 20. Specifically, the scattered portion from the first location 22 returns along a path having an angle $\tau_1$ relative to the Z-axis, while the scattered portion from the second location 24 returns along a path having an angle $\tau_2$ relative to the Z-axis.

The detector 20 includes two angularly-selective radiation detectors (not shown). A first angularly-selective radiation detector senses at time $t_1$ the scattered portion of the probe radiation beam returning from first location 22 along a path having an angle $\tau_1$ relative to the Z-axis. Similarly, a second angularly-selective radiation detector senses at time $t_2$ the scattered portion of the probe radiation beam returning from second location 24 along a path having an angle $\tau_2$ relative to the Z-axis. The two angularly-selective detectors are sensitive only to radiation incident upon the detector 20 at distinct fixed angles $\tau_1$ and $\tau_2$.

The elongate object 10 also contains a computing unit (not shown) which derives an orientation parameter of object 10 from the time difference $\Delta t=t_2-t_1$ between sensing the first and second scattered portions at the detector 20. It is a particular advantage of the present invention that the orientation parameter can be computed from a measurement of the time difference $\Delta t$ alone, and no other measurements are required. For example, it is evident from the geometric relationships in FIG. 2 that the orientation parameter η may be derived from knowledge of the distances $h_1$ and $h_2$ together with the two angles $\sigma_1$ and $\tau_1$ (or, alternatively, the two angles $\sigma_2$ and $\tau_2$). It can be difficult, however, to obtain an accurate measurement of the precise angle $\sigma_1$ during beam scanning. What is not immediately obvious is that the orientation parameter η may be derived from knowledge of the time difference $\Delta t=t_2-t_1$ between detection of the first and second scattered portions of the probe beam.

Given a fixed value of $\Delta\tau=\tau_1-\tau_2$, it can be seen from FIG. 2 that $\Delta\sigma=\sigma_1-\sigma_2$ is a monotonic function of the orientation parameter η. For example, compare original plane surface 26 with differently oriented plane surface 26' at angle η' with the X-axis. Scattered portions of the scan beam will arrive at angles $\tau_1$ and $\tau_2$ from surface locations 22' and 24', respectively, as the beam scans over an angle of $\Delta\sigma'$. It is evident, however, that $\Delta\sigma$ is larger than $\Delta\sigma'$ due to the difference between the values of η and η'. Thus, the value of η can be computed from the value of $\Delta\sigma$ using the monotonic increasing function, without need to know values of $\sigma_1$ and $\sigma_2$. The value of $\Delta\sigma$, in turn, can be determined from a measurement of $\Delta t$. In particular, assuming the angular velocity of the scanning is substantially linear during the scanning of the beam between the two angles $\sigma_1$ and $\sigma_2$, the scan angle difference $\Delta\sigma=\sigma_1-\sigma_2$ is a monotonic function of the time difference $\Delta t=t_2-t_1$. Consequently, this monotonic function can be used to determine $\Delta\sigma$ from $\Delta t$. Combining these observations, it is clear that η can be calculated from $\Delta t$.

Scanner

Figure 3:
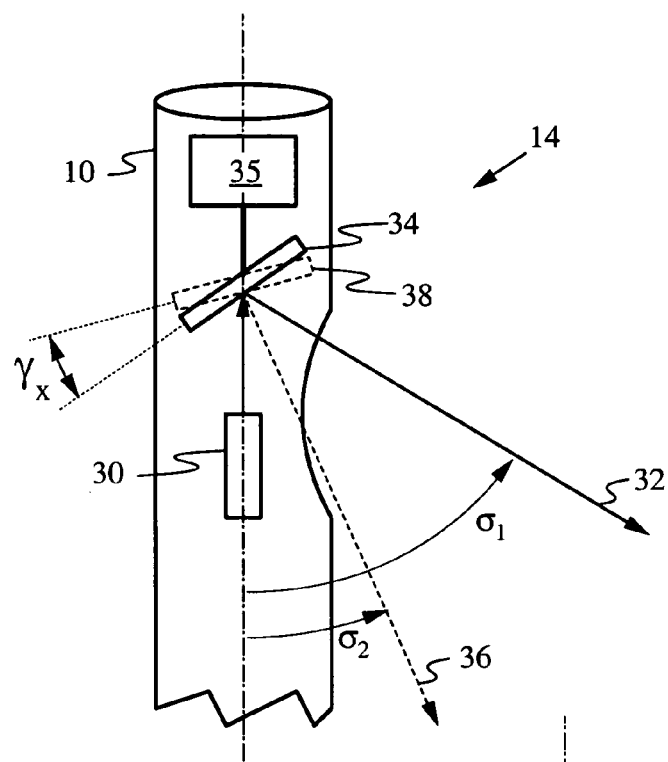
FIGS. 3&4 illustrate two arrangements for beam scanning according to two embodiments of the invention.

According to one specific embodiment, the elongate object 10 includes a beam source 30 and a beam direction controller 14 as shown in FIG. 3. Beam source 30 is preferably implemented as a pulsed or continuous coherent light source, such as a laser diode or vertical cavity surface emitting laser (VCSEL) powered by a small on-board battery (not shown). Beam source 30 may also be a non-coherent light source such as a light emitting diode (LED). In a preferred embodiment, the light source is monochromatic and the beam is collimated.

The beam direction controller 14 includes a beam deflection element, such as a microelectromechanical systems (MEMS) micromirror 34 whose x-deflection angle $\gamma_x$ may be controllably varied using a beam scanning control circuit 35. Together, this control circuit and the beam deflection element may be referred to as a uniaxial beam scanner, or biaxial beam scanner in the case where the angle of the beam deflection element may be varied around two orthogonal rotational axes.

In a uniaxial scanner, the angle σ of a beam 32 relative to a central axis of the object 10 may be varied by introducing a time-varying x-deflection angle γ(t) of the beam deflection element 34. For example, deflecting element 34 to a deflected position 38 changes the beam direction angle $\sigma_1$ to angle $\sigma_2$, moving beam 32 to deflected position 36.

Figure 4:
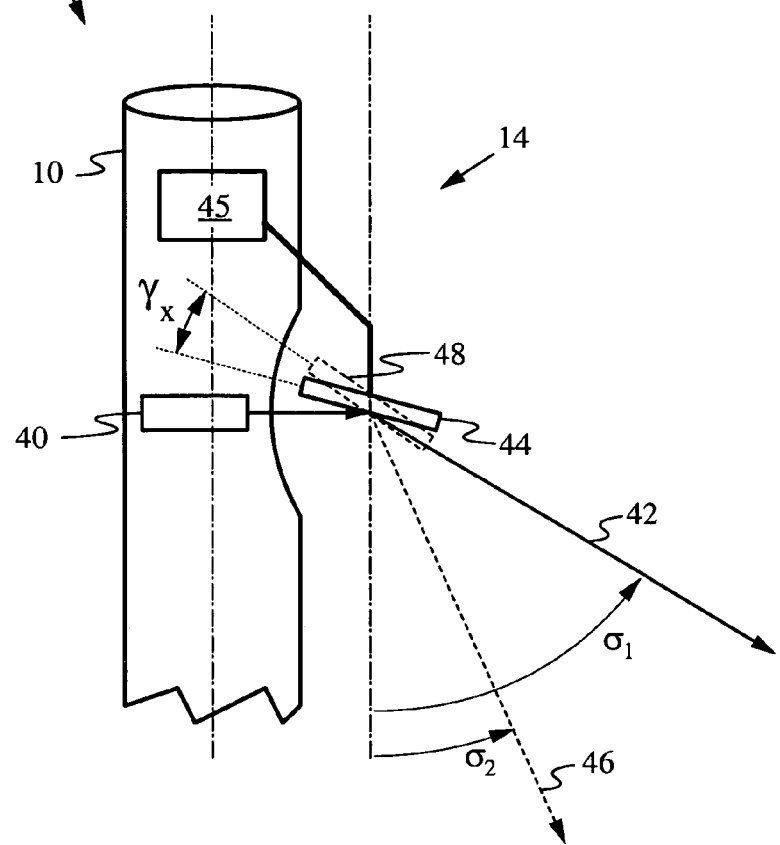

The embodiment shown in FIG. 3 has the beam source 30 and deflection element 38 within the casing of elongate object 10. In this configuration, the beam source 30 is preferably oriented to direct the beam in a generally upward direction so that it may be deflected back down and outward, as shown. Alternatively, as shown in FIG. 4, the beam source 40 may be oriented to direct the beam in a generally horizontal direction. A beam deflection element 44 mounted on the side of object 10 deflects the beam 42 downward at an angle $\sigma_1$ relative to the axis of object 10. In a deflected position 48 the beam 46 is directed at an angle $\sigma_2$ relative to the axis of object 10. Deflection angle $\gamma_x$ is controlled by scanning control circuit 45.

Figure 5:
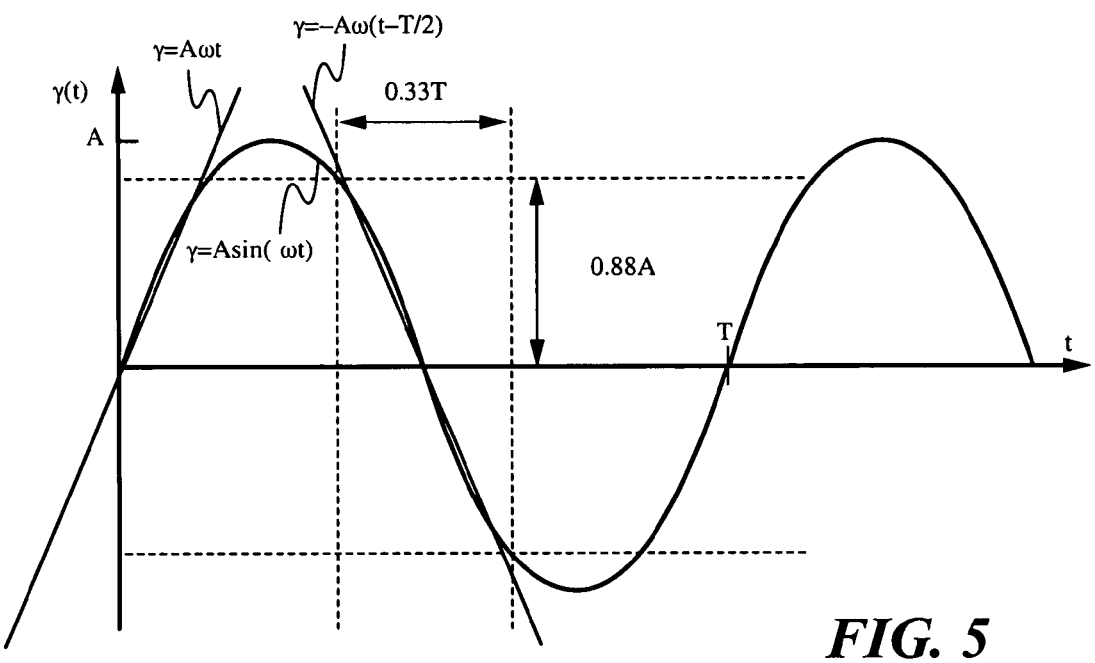
FIG. 5 is a graph of mirror deflection versus time illustrating a region of nearly linear deflection change.

The uniaxial beam scanner control circuit may comprise a timing unit to generate a sinusoidal variation in the deflection angle γ given by $\gamma(t)=A\sin(\omega t)$, which is graphed in FIG. 5. Here A is a maximum mirror deflection angle and ω is a constant mirror driving frequency. Preferably, the mirror oscillation period $T=2\pi/\omega$ is significantly smaller than the time between successive samples of pen orientation parameters. For example, when object 10 is a human-operated implement such as a cane, a pointer or a jotting implement such as a pen, pencil or stylus, then angle γ(t)

preferably varies fast enough to execute one complete cycle before any appreciable movement of the object 10 takes place.

As shown in the figure, the angular displacement $\gamma(t)$ is substantially linear for a considerable portion of the sinusoidal cycle, i.e., $A \sin(\omega t)$ closely approximates the line $(-1)^n A\omega(t-nT/2)$ in regions around $t=nT/2$, for any integer n. Specifically, the angular displacement $\gamma$ is within 6% of linear during 66% of each period, during which the displacement is less than 88% of the maximum displacement angle A. In these regions we have $\gamma(t) \approx (-1)^n A\omega(t-nT/2)$, e.g., $\gamma(t) \approx A\omega t$ when n=0. Thus, the mirror deflection angle $\gamma$ is directly proportional to time. Consequently, beam direction angle $\sigma$ is also directly proportional to time. Specifically, $\sigma(t)=\mu+2\gamma(t)$, where $\mu$ is a constant angle defined by the geometry of the device optics. Near t=0, we then have $\sigma(t) \approx \mu + 2A\omega t$. Thus, $\Delta\sigma \approx 2\omega \Delta t$.

In other embodiments, a biaxial scanner may be used to vary beam angle $\sigma$ by changing both an x-deflection angle $\gamma_x$ and a y-deflection angle $\gamma_y$ of beam deflection element 38. Alternatively, two uniaxial mirrors with orthogonally oriented axes may be used in conjunction to achieve the same result as a single biaxial mirror. When using a biaxial scanner, the scan pattern is preferably a Lissajous, i.e., sinusoidal in both directions, although with possibly different frequencies. For a mirror positioned on the central axis of the object, the analysis of the y-component is analogous to that of the x-component, so that beam direction angles $\sigma_x(t)$ and $\sigma_y(t)$ are both linear functions of time.

Those skilled in the art will appreciate that many other mechanical and optical designs can be used to perform the same beam scanning functionality as the embodiments described above.

Detector

Figure 6:
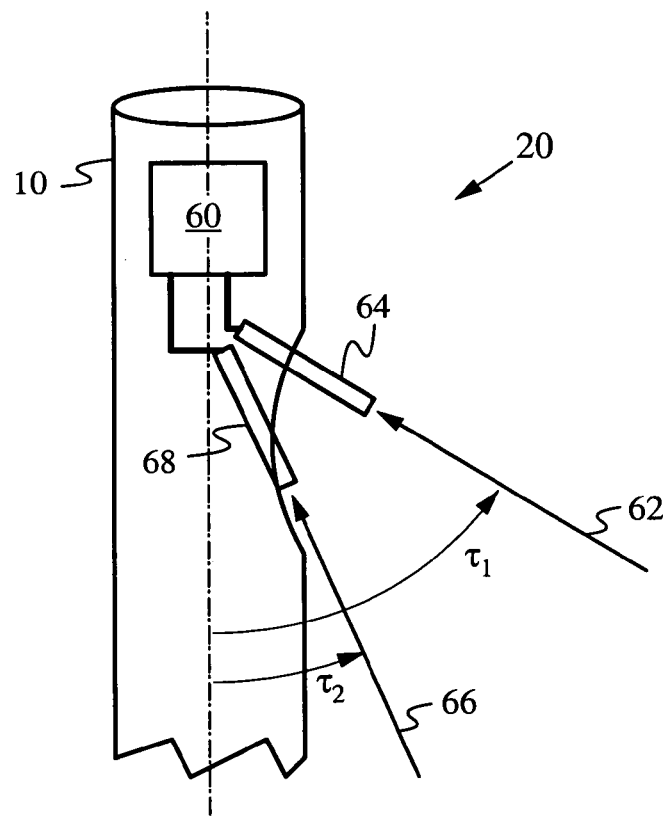
FIG. 6 illustrates a detector comprising two angularly-selective radiation detectors according to one embodiment of the invention.

FIG. 6 illustrates detail of an elongate object 10 provided with a detector 20 comprising two an angularly-selective detectors 64 and 68 according to one specific embodiment. Each of the angularly-selective detectors 64 and 68 is preferably an angular gating optic composed of suitable optical elements such as apertures, holographic elements, diffractive elements, refractive elements and reflective elements. The angularly-selective detector may also include a cylindrical lens, a collimating lens, a thick aperture, a system of apertures or a slit.

Each angularly selective detector preferably also includes a photoelectric element such as a photodiode or photodetector array for converting received optical energy to an electronic signal. In some embodiments, it is preferable to use a photodetector array and appropriate optics to image the scattered portion of radiation onto the array. Calculating the position of the imaged spot on the array can improve accuracy of the sensed time measurement.

Each of the two angularly-selective detectors is designed to be sensitive to radiation incident at a fixed characteristic angle $\tau$. In the embodiment shown, detector 64 selectively senses radiation 62 incident at a fixed angle $\tau_1$, while detector 68 selectively senses radiation 66 incident at a fixed angle $\tau_2$. The difference $\tau_1 - \tau_2$ is preferably selected together with the maximum mirror deflection amplitude A so that detection of the first and second scattered portions of the probe radiation beam at angles $\tau_1$ and $\tau_2$ correspond to mirror deflections of no more than 88% of A during normal operation of the device.

Calculation

Electronic signals from angularly selective detectors 64 and 68 are communicated to a computing unit 60 which may include a signal amplifier and a timing circuit that measures a time difference $\Delta t$ between the sensed scattered portions of probe radiation at detectors 64 and 68. The signal may be converted to a digital signal prior to measuring $\Delta t$, or the measurement of $\Delta t$ can be made without converting the signal to a digital signal. Circuit 60 also includes a digital computational circuit that uses the measured time difference $\Delta t$ to determine at least one orientation parameter of the object 10, such as the angle $\eta$. More specifically, from the geometrical relationships shown in FIG. 2, one can relate values for $\eta$ to corresponding values for $\sigma$. For example, one can show that the distance d from the tip 12 to scan point 24 is given by $h_1 \sin \sigma_2/\cos(\eta - \sigma_2)$ and also by $h_2 \sin \tau_2/\cos(\eta - \tau_2)$. Thus, setting these equal to each other, one can find, for given values of $h_1$, $h_2$, $\tau_2$, and $\sigma_2$, a corresponding value for $\eta$. Similarly, one can find, for given values of $h_1$, $h_2$, $\tau_1$, and $\sigma_1$, a corresponding value for $\eta$. Thus, for each value of $\eta$, there is a corresponding value for the difference $\Delta\sigma = \sigma_1 - \sigma_2$. Now, in the linear regions the angle $\sigma$ is a linear function of time, thus from a measured value of $\Delta t$ one can determine $\Delta\sigma$ and then the corresponding value for $\eta$. This is preferably performed using a precomputed lookup table included in the computing unit. Alternatively, it can be calculated in real time using computational circuitry.

In the case of a biaxial scanning system, the two scanning axes provide corresponding measured time intervals $\Delta t_x$ and $\Delta t_y$ which provide orientation parameters $\eta_x$ and $\eta_y$, respectively, where $\eta_y$ is the angle in the Y-Z axis between the Y-axis and the X'-Y' plane surface. Once these values of angle $\eta$ are both known, then the values of Euler angles $\theta$, $\psi$ can be derived.

It will be evident to a person skilled in the art that the present invention admits of various other embodiments.

What is claimed is:

1. A method for determining at least one orientation parameter of an elongate object having a tip contacting a plane surface, the method comprising:
   a) illuminating the plane surface with a probe radiation beam emitted from the elongate object at an angle $\sigma$ relative to an axis of the elongate object;
   b) varying the angle $\sigma$ in accordance with a predetermined pattern so that the probe radiation beam illuminates various locations on the plane surface at various corresponding times;
   c) detecting at the elongate object at a first time $t_1$ a first scattered portion of the probe radiation beam returning from a first illuminated location along a path having a first predetermined angle $\tau_1$ relative to the axis;
   d) detecting at the elongate object at a second time $t_2$ a second scattered portion of the probe radiation beam returning from a second illuminated location along a path having a second predetermined angle $\tau_2$ relative to the axis;
   e) deriving the orientation parameter from a time difference $\Delta t = t_2 - t_1$ between detecting the first scattered portion and the second scattered portion.

2. The method of claim 1, wherein the predetermined pattern is a continuous scan pattern.

3. The method of claim 2, wherein the continuous scan pattern is a uniaxial scan pattern.

4. The method of claim 3, wherein the uniaxial scan pattern varies sinusoidally with respect to time, and wherein the first and second illuminated locations are illuminated during a substantially linear region of variation of the uniaxial scan pattern.

5. The method of claim 2, wherein the continuous scan pattern is a biaxial scan pattern.

6. The method of claim 1, wherein the at least one orientation parameter comprises an Euler angle of the elongate object.

7. The method of claim 6, wherein the Euler angle is the second Euler angle $\theta$.

8. The method of claim 1, wherein the plane surface comprises a jotting surface.

9. The method of claim 8, wherein the jotting surface is selected from the group consisting of a screen, a display, a pad, and a paper surface.

10. The method of claim 1, wherein the elongate object is selected from the group consisting of jotting implements, pointers, robotic arms, and canes.

11. The method of claim 10, wherein the jotting implements are selected from the group consisting of pens, pencils, and styluses.

12. An apparatus for determining at least one orientation parameter of an elongate object having a tip contacting a plane surface, the apparatus comprising:
 a) a beam source for emitting a probe radiation beam from the elongate object to illuminate the plane surface;
 b) a beam direction controller for directing the probe radiation beam from the elongate object at various angles $\sigma$ relative to an axis of the elongate object to various locations on the plane, wherein the various angles $\sigma$ are in accordance with a predetermined pattern;
 c) a first angularly-selective radiation detector for sensing at a first time $t_1$ a first scattered portion of the probe radiation beam returning from a first location on the plane surface to the elongate object along a first path having a first angle $\tau_1$ relative to the axis;
 d) a second angularly-selective radiation detector for sensing at a second time $t_2$ a second scattered portion of the probe radiation beam returning from a second location on the plane surface to the elongate object along a second path having a second angle $\tau_2$ relative to the axis;
 e) a computing unit for deriving the orientation parameter from a time difference $\Delta t = t_2 - t_1$ between sensing the first scattered portion and sensing the second scattered portion.

13. The apparatus of claim 12, wherein the beam direction controller comprises a beam scanner selected from the group consisting of uniaxial scanners and biaxial scanners.

14. The apparatus of claim 12, wherein the beam source comprises a laser.

15. The apparatus of claim 12, wherein the angularly-selective detector comprises an angular gating optic.

16. The apparatus of claim 15, wherein the angular gating optic comprises at least one element selected from the group consisting of apertures, holographic elements, diffractive elements, refractive elements and reflective elements.

17. The apparatus of claim 12, wherein the computing unit comprises a timing circuit and a look-up table.

* * * * *